(12) United States Patent
Kumaran

(10) Patent No.: US 8,983,141 B2
(45) Date of Patent: Mar. 17, 2015

(54) GEOPHYSICAL DATA TEXTURE SEGMENTATION USING DOUBLE-WINDOWED CLUSTERING ANALYSIS

(75) Inventor: Krishnan Kumaran, Raritan, NJ (US)

(73) Assignee: ExxonMobile Upstream Research Company, Houston, TX (US)

( * ) Notice: Subject to any disclaimer, the term of this patent is extended or adjusted under 35 U.S.C. 154(b) by 636 days.

(21) Appl. No.: 13/408,419

(22) Filed: Feb. 29, 2012

(65) Prior Publication Data

US 2012/0234554 A1 Sep. 20, 2012

Related U.S. Application Data

(60) Provisional application No. 61/453,809, filed on Mar. 17, 2011.

(51) Int. Cl.
*G06K 9/00* (2006.01)
*G01V 1/32* (2006.01)

(52) U.S. Cl.
CPC ..................... *G01V 1/325* (2013.01)
USPC ....... 382/109; 73/152.01; 348/85; 356/241.1; 367/14

(58) Field of Classification Search
USPC ......... 382/100, 103, 108, 109, 181, 190, 195; 73/152.01, 784; 348/85; 356/241.1; 367/1–190
See application file for complete search history.

(56) References Cited

U.S. PATENT DOCUMENTS

| | | | |
|---|---|---|---|
| 4,916,615 A | 4/1990 | Chittineni | |
| 4,992,995 A | 2/1991 | Favret | |
| 5,047,991 A | 9/1991 | Hsu | |
| 5,136,551 A * | 8/1992 | Armitage | 367/38 |
| 5,265,192 A | 11/1993 | McCormack | |
| 5,274,714 A | 12/1993 | Hutcheson et al. | |
| 5,416,750 A | 5/1995 | Doyen et al. | |
| 5,444,619 A | 8/1995 | Hoskins et al. | |
| 5,465,308 A | 11/1995 | Hutcheson et al. | |
| 5,539,704 A | 7/1996 | Doyen et al. | |
| 5,553,704 A | 7/1996 | Doyen et al. | |

(Continued)

FOREIGN PATENT DOCUMENTS

| | | |
|---|---|---|
| WO | WO 99/64896 | 12/1999 |
| WO | WO 01/84462 | 11/2001 |
| WO | WO 2010/056424 | 5/2010 |

OTHER PUBLICATIONS

Aribot, J.P. (2003), "Texture Segmentation," Audiovisual Communications Laboratory, Swiss Federal Institute of Technology, 23 pgs.

(Continued)

*Primary Examiner* — Anand Bhatnagar
(74) *Attorney, Agent, or Firm* — ExxonMobile Upstream Research Company Law Dept.

(57) ABSTRACT

An automated method for texture segmentation (11) of geophysical data volumes, where texture is defined by double-window statistics of data values, the statistics being generated by a smaller pattern window moving around within a larger sampling window (12). A measure of "distance" between two locations is selected based on similarity between the double-window statistics from sampling windows centered at the two locations (13). Clustering of locations is then based on distance proximity (14).

11 Claims, 6 Drawing Sheets
(5 of 6 Drawing Sheet(s) Filed in Color)

(56) References Cited

U.S. PATENT DOCUMENTS

| | | | |
|---|---|---|---|
| 5,586,082 A | 12/1996 | Anderson et al. | |
| 5,852,588 A | 12/1998 | de Hoop et al. | |
| 5,940,777 A | 8/1999 | Keskes | |
| 6,052,650 A | 4/2000 | Assa et al. | |
| 6,226,596 B1 | 5/2001 | Gao | |
| 6,236,942 B1* | 5/2001 | Bush | 702/14 |
| 6,295,504 B1 | 9/2001 | Ye et al. | |
| 6,363,327 B1 | 3/2002 | Wallet et al. | |
| 6,411,903 B2 | 6/2002 | Bush | |
| 6,473,696 B1 | 10/2002 | Onyia et al. | |
| 6,560,540 B2 | 5/2003 | West et al. | |
| 6,574,566 B2 | 6/2003 | Grismore et al. | |
| 6,618,678 B1 | 9/2003 | Van Riel | |
| 6,625,541 B1 | 9/2003 | Shenoy et al. | |
| 6,631,212 B1 | 10/2003 | Lou et al. | |
| 6,725,163 B1 | 4/2004 | Trappe et al. | |
| 6,735,526 B1 | 5/2004 | Meldahl et al. | |
| 6,757,614 B2 | 6/2004 | Pepper et al. | |
| 6,804,609 B1 | 10/2004 | Brumbaugh | |
| 6,847,895 B2 | 1/2005 | Nivlet et al. | |
| 6,950,786 B1 | 9/2005 | Sonneland et al. | |
| 6,957,146 B1 | 10/2005 | Taner et al. | |
| 6,970,397 B2 | 11/2005 | Castagna et al. | |
| 7,039,239 B2 | 5/2006 | Loui et al. | |
| 7,095,677 B2* | 8/2006 | Canning | 367/47 |
| 7,162,463 B1 | 1/2007 | Wentland et al. | |
| 7,184,991 B1 | 2/2007 | Wentland et al. | |
| 7,188,092 B2 | 3/2007 | Wentland et al. | |
| 7,248,258 B2 | 7/2007 | Acosta et al. | |
| 7,295,706 B2 | 11/2007 | Wentland et al. | |
| 7,308,139 B2 | 12/2007 | Wentland et al. | |
| 7,453,767 B1 | 11/2008 | Padgett | |
| 7,463,552 B1 | 12/2008 | Padgett | |
| 7,668,043 B2* | 2/2010 | Wu | 367/31 |
| 2003/0200030 A1 | 10/2003 | Meldahl et al. | |
| 2004/0190374 A1* | 9/2004 | Alft et al. | 367/14 |
| 2004/0210394 A1 | 10/2004 | Trappe et al. | |
| 2004/0240321 A1* | 12/2004 | Canning | 367/47 |
| 2004/0260476 A1 | 12/2004 | Borgos et al. | |
| 2005/0043892 A1* | 2/2005 | Lichman et al. | 702/13 |
| 2005/0125157 A1 | 6/2005 | Toelle | |
| 2005/0171700 A1* | 8/2005 | Dean | 702/16 |
| 2005/0222774 A1 | 10/2005 | Dulac et al. | |
| 2006/0100785 A1 | 5/2006 | Laurent et al. | |
| 2006/0115145 A1 | 6/2006 | Bishop et al. | |
| 2008/0212841 A1 | 9/2008 | Gauthier et al. | |
| 2010/0121851 A1 | 5/2010 | Kumaran | |

OTHER PUBLICATIONS

Bocquet, M. et al., "Beyond Gaussian statistical modeling in geophysical data assimilation," http://idl.ul.pt/carlospires/nongaussianity_review-24032010.pdf, pp. 1-51.
Donoser, M. et al. (2008), "Using covariance matrices for unsupervised texture segmentation," *ICPR*, 4 pgs.
Fernandez, M. et al. (2000), "Texture Segmentation of a 3D Seismic Section with Wavelet Transform and Gabor Filters," *ICPR* 3, p. 354-357.
Galun, M. et al. (2003), "Texture segmentation by multiscale aggregation of filter responses and shape elements," *ICCV*, pp. 716-723.
Hale, D. et al. (2003), "Seismic interpretation using global image segmentation,"73rd Annual Int'l. SEG Meeting, 4 pgs.
Haralick, R.M. (1979), "Statistical and structural approaches to texture," *Proc. Of the IEEE* 67(5), pp. 786-804.
Hays, J.H. (2006) , "Discovering texture regularity as a higher-order correspondence problem," *ECCV* 2, pp. 522-535.
Hensley, J. et al. (2005), Fast Summed-Area Table Generation and its Applications, *Eurographics* 24(3), pp. 9.
Hofmann, T. et al. (1998), "Unsupervised texture segmentation in a deterministic annealing framework," *IEEE TPAMI* 20, pp. 803-818.
Julesz, B. (1981), "Textons, the elements of texture perception and their interactions," *Nature* 290, pp. 91-97.
Kim, S.C. et al. (2007), "Texture classification and segmentation using wavelet packet frame and Gaussian mixture model," *Pattern Recognition* 40, pp. 1207-1221.
Leung, T. et al. (2001), "Representing and recognizing the visual appearance of materials using three-dimensional textons," *IJCV* 43(2), pp. 29-44.
Lin, W.C. et al. (2007), A lattice-based MRF model for dynamic near-regular texture tracking, *IEEE Trans. Pattern Anal. Mach. Intell.* 29(5), pp. 777-792.
Lomask, J. et al. (2004), "Image segmentation for tracking salt boundaries," SEG Int'l. Exposition and 74th Annual Meeting, 4 pgs.
Malik, J. et al. (2001), "Contour and texture analysis for image segmentation, *Int. J. Comput. Vision* 43(1), pp. 7-27.
Ozyildiz, E. et al. (2001), "Adaptive Texture and Color Segmentation for Tracking Moving Objects," Dept. of Computer Science and Engineering, Pennsylvania State University, 36 pgs.
Pitas, I. et al. (1992), "A texture-based approach to the segmentation of seismic images," Pattern Recognition 25(9), pp. 929-945.
Schachter, B. et al. (1979), "Random pattern generation processes," *CGIP* 10(2), pp. 95-114.
Siliqi, R. et al. (2007), "High Order RMO Picking using uncorrelated parameters," SEG/San Antonio 2007 Annual Meeting, pp. 2772-2776.
Todorovic, S. et al. (2009), "Texel-based Texture Segmentation," Proc. IEEE Int'l. Conf. Computer Vision (ICCV), Kyoto, Japan, pp. 841-848.
Valet, L. et al. (2001), "Seismic image segmentation by fuzzy fusion of attributes," *IEE Transactions on Instrumentation and Measurement* 50(4), pp. 1014-1018.
Varma, M. et al. (2005), "A statistical approach to texture classification from single images," *IJCV* 62(1-2), pp. 61-81.
Voorhees, H. et al. (1988), "Computing texture boundaries from images", *Nature* 333, pp. 364-367.
Weldon, T.P. et al. (1996), "Design of Multiple Gabor Filters for Texture Segmentation," *ICASSP*, 4 pgs.
Wikipedia, "Bhattacharyya distance," 4 pgs, printed Mar. 10, 2011.
Wikipedia, "Golden section search," 5 pgs, Printed Mar. 9, 2011.
Yang, A. et al. (2007), "Unsupervised Segmentation of natural Images via Lossy Data Compression," Elsevier, 24 pgs.
Zhu, S.C. et al. (2005), "What are textons?," *IJCV* 62(1-2), pp. 121-143.

* cited by examiner

GEOPHYSICAL DATA TEXTURE SEGMENTATION USING DOUBLE-WINDOWED CLUSTERING ANALYSIS

This application claims the benefit of U.S. Provisional Patent Application No. 61/453,809, filed Mar. 17, 2011, entitled GEOPHYSICAL DATA TEXTURE SEGMENTATION USING DOUBLE-WINDOWED CLUSTERING ANALYSIS, the entirety of which is incorporated by reference herein.

FIELD OF THE INVENTION

This invention relates generally to the field of geophysical prospecting and, more particularly, to identification of geobodies in volumes of geophysical data such as seismic data. Specifically, the invention is a method for texture segmentation using double-windowed clustering analysis.

BACKGROUND OF THE INVENTION

Texture segmentation is a widely studied area of research in signal/image processing, which aims to divide a time-series or spatial dataset into sub-regions that have high internal homogeneity but differ significantly from each other. The seismic analysis community has also produced some methods that can segment seismic data automatically to facilitate faster analysis. However, most of these methods are based on designing "texture attributes", or derived properties of the signal, i.e. the data, that can highlight different textures a priori. Other methods begin with small homogeneous regions that are then sequentially merged according to some pre-defined similarity criterion. Still other approaches use libraries of templates or training data for segmentation. Some examples of existing approaches are shown in the following list:

1. S. Todorovic and N. Ahuja, "Texel-based Texture Segmentation", Proc. IEEE Int'l. Conf. Computer Vision (ICCV), Kyoto, Japan, 2009
2. M. Donoser and H. Bischof, "Using covariance matrices for unsupervised texture segmentation", *ICPR*, 2008
3. M. Galun, E. Sharon, R. Basri and A. Brandt, "Texture segmentation by multiscale aggregation of filter responses and shape elements", *ICCV, pp.* 716-723, 2003
4. R. M. Haralick, "Statistical and structural approaches to texture", *Proc. Of the IEEE* 67(5), pp. 786-804 (1979)
5. J. H. Hays, M. Leordeanu, A. A. Efros and Y. Liu, "Discovering texture regularity as a higher-order correspondence problem", *ECCV* 2, pp. 522-535, 2006
6. T. Hofmann, J. Puzicha, J. M. Buhmann and R. Friedrich, "Unsupervised texture segmentation in a deterministic annealing framework", *IEEE TPAMI* 20, pp. 803-818, 1998
7. B. Julesz, "Textons, the elements of texture perception and their interactions", *Nature* 290, pp. 91-97, 1981
8. T. Leung and J. Malik, "Representing and recognizing the visual appearance of materials using three-dimensional textons", *IJCV* 43(2), pp. 29-44, 2001
9. W. C. Lin and Y. Liu, "A lattice-based MRF model for dynamic near-regular texture tracking", *IEEE Trans. Pattern Anal. Mach. Intell.* 29(5), pp. 777-792, 2007
10. J. Malik, S. Belongie, T. Leung and J. Shi, "Contour and texture analysis for image segmentation", *Int. J. Comput. Vision* 43(1), pp. 7-27, 2001
11. B. Schachter and N. Ahuja, "Random pattern generation processes", *CGIP* 10(2), 95-114, 1979
12. M. Varma and A. Zisserman, "A statistical approach to texture classification from single images", *IJCV* 62(1-2), pp. 61-81, 2005
13. H. Voorhees and T. Poggio, "Computing texture boundaries from images", *Nature* 333, pp. 364-367, 1988
14. S. C. Zhu, C. E. Guo, Y. Wang and Z. Wu, "What are textons?", *IJCV* 62(1-2), pp. 121-143, 2005
15. M. Fernandez Limia, A. Mavilio Nunez, M. Tejera Fernandez, "Texture Segmentation of a 3D Seismic Section with Wavelet Transform and Gabor Filters", *ICPR* 3, pg. 3358, 15$^{th}$ Int'l. Conf. on Pattern Recognition, 2000
16. Brian West and Steve May, "Method for Seismic Facies Interpretation Using Textural Analysis and Neural Networks," U.S. Pat. No. 6,560,540.

Other examples are compiled and discussed in the survey article by Jean-Pascal Aribot entitled Texture Segmentation that may be downloaded at http://www.mics.ch/SumIntU03/JPAribot.pdf.

The present invention is a method that does not require any training data, attributes or pre-defined similarity measures designed to distinguish textures. Instead, it extracts statistical distributions of user-defined windows on the data, and clusters the distributions according to a standard similarity metric between probability distributions, including similarity metrics commonly used in the literature. This lack of pre-defined criteria, combined with the sensitivity of the method, which enables significantly better and more robust results than alternatives, make the present inventive method particularly advantageous for datasets that do not have a well known pre-defined structure, which is often the case for complex datasets such as seismic data.

SUMMARY OF THE INVENTION

In one embodiment, the invention is a computer-implemented method for performing texture segmentation of one or more volumes of geophysical data, comprising using local statistical distributions of data values, said distributions computed using two moving windows of user-selected size and shape, one being a pattern window and the other a sampling window larger than the pattern window, wherein the pattern window moves about within the sampling window to generate the local statistical distribution for the sampling window's location, and then selecting a distance measure of similarity followed by partitioning the geophysical data into clusters on a basis of application of the distance measure of similarity to the local statistical distributions for pairs of locations.

BRIEF DESCRIPTION OF THE DRAWINGS

The patent or application file contains at least one drawing executed in color. Copies of this patent or patent application publication with color drawing(s) will be provided by the Office upon request and payment of the necessary fees.

The present invention and its advantages will be better understood by referring to the following detailed description and the attached drawings in which.

The invention will be described in connection with example embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims. Persons skilled in the technical field will readily recognize that in practical applications of the present inventive method, it is performed on a computer programmed in accordance with the teachings herein. Indeed, the method was developed with automated use in mind, which is one of its advantages.

DETAILED DESCRIPTION OF EXAMPLE EMBODIMENTS

Figure 2:
FIG. 2 is a time-series example with multiple texture segments.
Figure 3:
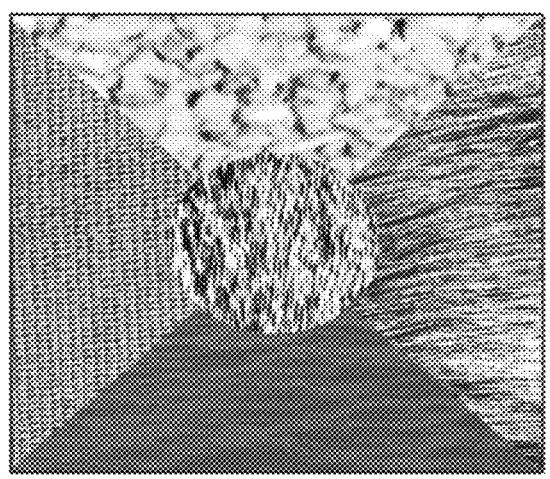
FIG. 3 is a 2-dimensional image with multiple textures.

Texture segmentation (see the references listed in the "Background" section), in one of its many equivalent forms, is a long studied topic in many fields of research involving spatial or time-series data analysis, including but not limited to computer vision, signal processing (telecommunications by wireless/data or optical networks, image processing (e.g., terrestrial, satellite, radar, medical, or robotic), time-series analysis (stock or financial data) and many others. The basic task consists of breaking up a sequence of data values such as in a time-series, or a spatial configuration of values such as in an image, into regions which are internally statistically homogeneous, with clear and quantifiable differences across regions, as shown in FIGS. 2 and 3.

The distinct regions in these figures can then be considered distinct textures, a term that is widely understood by illustration, but without a clear mathematical definition so far either in the theoretical or practice-oriented literature. While there is a lot of literature based on the concept of "textons", which are elementary texture patterns that can compose repeating image patterns, it is not clear how textons can be defined to be robust or comprehensive. In this document, an alternative intuitive definition of texture is proposed that naturally enables the segmentation (separation) of such datasets into the distinct regions that are obvious to the human observer. With this introduction, the new concept of texture and how it may be used for segmentation follows next.

Definition of Texture as Window Statistics

Consider the following general definition of a multi-dimensional dataset: At each point $x_i \in R^N$: i=1, ... K in N-dimensional space, a vector $v_i \in R^M$: i=1, ... K, is given. For example, a 256×256 RGB-color image has N=2, M=3, K=256×256=65536. In another example, time series data of an industrial process unit with 50 measurement points that produce a single reading each in one minute intervals for an hour would have N=1, M=50, K=60.

Next, define two nested windows of user-defined size and shape on such a dataset. The smaller window, known as the Pattern Window is contained within the larger Sampling Window as shown symbolically in FIG. 4.

Figure 4:
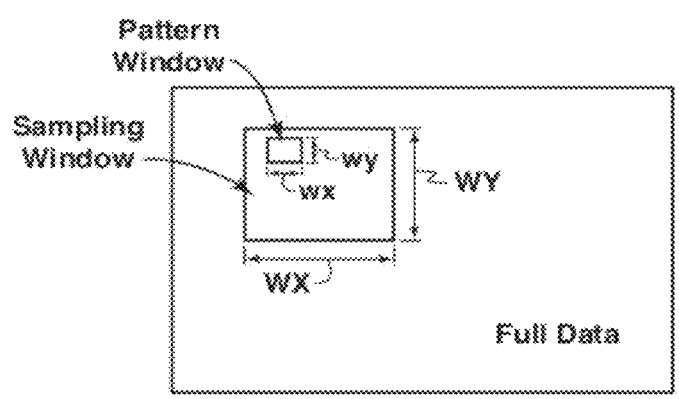
FIG. 4 is a schematic diagram illustrating the pattern window and the sampling window as used in the present invention's definition of texture.

For example, in FIG. 4, the wx×wy pattern window moves within the WX×WY sampling window. The window can move from one position to an adjacent position where it will partly overlap its previous position. For now, assume the data to be a 2-D grayscale image (not shown). The "texture" at the center of the sampling window will then be defined by the wx*wy dimensional joint distribution of the pattern window over the sampling window. Consider the simplest case where the distribution is represented by a multi-dimensional Gaussian. At each location x',y', define a pattern vector V(x'.y') obtained by concatenating all values within the pattern window as a linear vector. The mean and covariance of the distribution at x,y may then be computed as the mean and covariance of (WX−wx)*(WY−wy) pattern vectors contained in the sampling window centered at x,y, assuming that the pattern window stays inside the sampling window for all positions.

Note that the above definition thus characterizes texture at a spatial scale characterized by the pattern window, with statistical estimation determined by the sampling window. The set of distributions obtained by scaling the two windows can then be viewed as textures at each location at those scales. It is also straight-forward to extend this method to data in any number of dimensions, with any number of independent attributes at each point in that space, i.e. $x \in R^N$, $y(x) \in R^M$. In this case, with a cuboidal window of size vector $w=\{w_k, k=1, \ldots N\}$, the pattern vector V(x) would be the concatenation of all the y's in the window, and would hence have dimension given by $$dim(V(x)) = M \prod_{k=1}^{N} w_k.$$

This clearly implies the explosion of the dimensionality of the algorithm, and computational limitations will rule out use of very large window sizes, unless significant parallel computing can be brought to bear. This can be accomplished by the use of Summed Area Tables (SATs), which are standard data structures used in image processing and other spatial data applications like radar, hyper-spectral imaging etc. See, for example, the online reference: Hensley, J., Scheuermann, T., Coombe, G., Singh, M. and Lastra, A. (2005), Fast Summed-Area Table Generation and its Applications, *Computer Graphics Forum* 24, pp. 547-555.

Next it is shown how the above definitions can be used to perform texture segmentation.

Texture Segmentation Algorithm

In one embodiment of the present invention, a texture segmentation algorithm may be constructed as described in this section. For a given set of window shapes and sizes, compute the distributions $p_{x,y}(V)$ of the pattern vectors at each location x,y, using a 2-D data set as an example. This may be considered to be a single two-dimensional distribution, a joint distribution of the pattern window using all its samples within the sampling window. In the Gaussian case this reduces to computing the mean vector and covariance matrix of V at each location. (See PCT Publication No. WO2010/056424). While this looks computationally very daunting, we will discuss a relatively efficient method later that can exploit the high level of redundancy in the computations using the data structure referred to above, i.e. Summed Area Tables ("SATs").

Figure 5A:
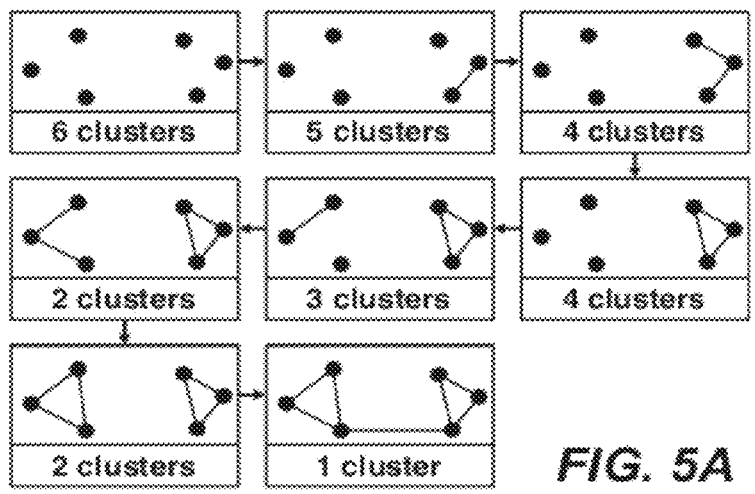
FIGS. 5A-5B illustrate agglomerative clustering (5A) and a typical tradeoff curve and selection of optimal number of clusters (5B)
Figure 5B:
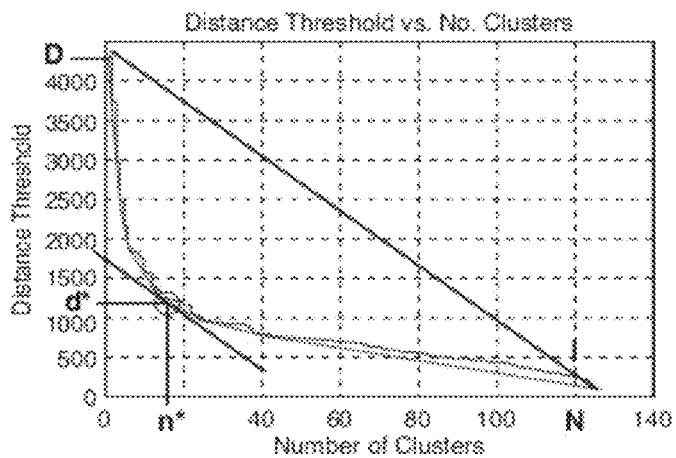

We then perform a clustering of similar distributions using any standard clustering algorithm, such as K-means. See, for example, http://www-users.cs.umn.edu/~kumar/dmbook/ch8.pdf. For greater robustness, and to obtain a better handle over the number of clusters, we may also implement a connectivity-based clustering algorithm, that provides a trade-off curve of the number of clusters vs. clustering quality. Such an algorithm is based on a well-known procedure called "agglomerative clustering", but it maintains clustering metrics that can provide the trade-off curve. See U.S. Patent Publication No. 2010/0121851. Agglomerative clustering and the trade-off curve are illustrated in FIGS. 5A-5B, respectively, where in FIG. 5A clustering is indicated by lines connecting the dots. In FIG. 5B, the irregular curve shows the clustering results. The smooth curve is a concave minor, i.e. a concave lower bound to the irregular curve. The straight line connects the curve endpoints. The tangent to the smooth curve is moved along the curve until the slope matches that of the straight line. This is one way to determine the optimum trade-off, shown in the drawing as (n*,d*).

Note on the Distance Function Between Distributions

An important ingredient in this process is the distance/similarity metric, which determines which textures are similar based on their distributions p(V) and q(V), i.e. one x,y location having a distribution p(V) and a second x',y' location having a distribution q(V). A standard metric used in similar situations is the well known Kullback-Leibler Divergence (K-L) defined as $$D_{p,q}^{KL} = \int dV p(V) \log\left(\frac{p(V)}{q(V)}\right).$$

See M. Bocquest, C. A. Fires, L. Wu, Beyond Gaussian statistical modeling in geophysical data assimilation (http://idl.ul.pt/carlospires/nongaussianity_review-24032010.pdf, pp. 1-51). For multi-dimensional Gaussians, this takes the form $$p(x) = \frac{1}{(2\pi)^{N/2}[\det(\Sigma_p)]^{1/2}} e^{-(x-m_p)^T \Sigma_p^{-1}(x-m_p)/2}$$

$$q(x) = \frac{1}{(2\pi)^{N/2}[\det(\Sigma_q)]^{1/2}} e^{-(x-m_q)^T \Sigma_q^{-1}(x-m_q)/2}$$

$$D_{p,q}^{KL} = \frac{1}{2}\left[\log\left(\frac{\det\Sigma_p}{\det\Sigma_q}\right) + tr(\Sigma_p^{-1}\Sigma_q) + (m_p - m_q)^T \Sigma_p^{-1}(m_p - m_q) - N\right]$$

Although widely used, the K-L divergence has some drawbacks, including lack of symmetry. Instead, a preferred embodiment of the present inventive method uses a new distance metric of the form $$\Phi_{p,q}(t) = \int dV [p(V)]^t [q(V)]^{1-t}$$

$$D_{p,q} = -\log \min_{t \in [0,1]} \Phi_{p,q}(t).$$

Apart from having the desirable property of being symmetric in the exchange of p and q, it can be shown that this metric provides more reliable notion of the difference between the distributions, which is explained herein below. Further, the K-L divergences can be shown to be slopes of the function Φ(t) at t=0 and t=1, i.e.

$$\left.\frac{d\Phi_{p,q}(t)}{dt}\right|_{t=1} = D_{p,q}^{KL}; \quad \left.\frac{d\Phi_{p,q}(t)}{dt}\right|_{t=0} = -D_{q,p}^{KL}$$

Figure 6:
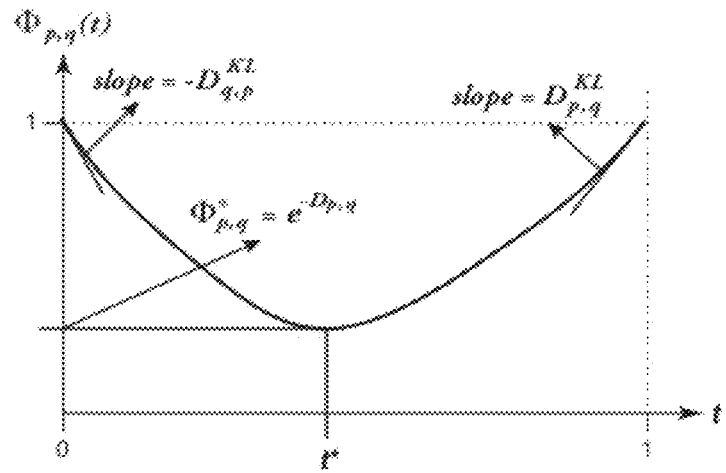
FIG. 6 is a schematic diagram of new distance function for probability distributions and showing its relation to the K-L Divergence distance function.
Figure 7A:
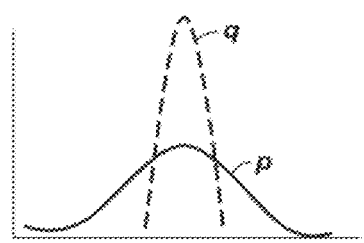
FIGS. 7A-7D show four examples where the distances could differ substantially between the K-L measure and the measure of the present invention, and the K-L distance could be misleading.
Figure 7B:
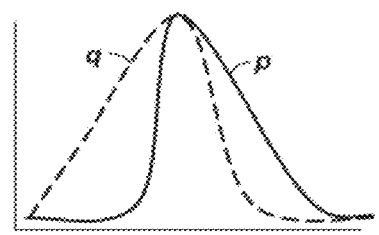
Figure 7C:
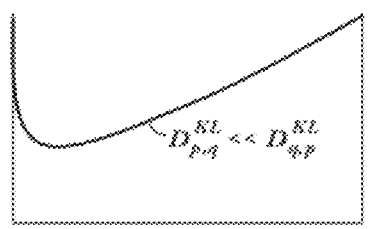
Figure 7D:
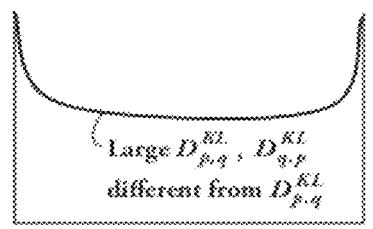

All these observations are depicted in FIG. 6. (The new 1 metric is also loosely related to another metric known as the "Bhattacharya distance". See, for example, Wikipedia, http://en.wikipedia.org/wiki/Bhattacharyya_distance.)

In particular, the example distributions in FIGS. 7A-7D show four circumstances under which the K-L divergence can be misleading, while the present formulation provides a more reliable similarity measure.

Again, for the Gaussian case, this new distance measure of the present invention can be obtained as follows:

$$p(x) = \frac{1}{(2\pi)^{N/2}[\det(\Sigma_1)]^{1/2}} e^{-(x-\mu_1)^T \Sigma_1^{-1}(x-\mu_1)/2}$$

$$q(x) = \frac{1}{(2\pi)^{N/2}[\det(\Sigma_2)]^{1/2}} e^{-(x-\mu_2)^T \Sigma_2^{-1}(x-\mu_2)/2}$$

$$\Rightarrow \Phi_{p,q}(t) = \frac{1}{2}[\log\det\Sigma_t + \mu_t^T \Sigma_t^{-1} \mu_t] -$$

$$\frac{t}{2}[\log\det\Sigma_1 + \mu_1^T \Sigma_1^{-1} \mu_1] - \frac{(1-t)}{2}[\log\det\Sigma_2 + \mu_2^T \Sigma_2^{-1} \mu_2]$$

where $$\Sigma_t^{-1} = t\Sigma_1^{-1} + (1-t)\Sigma_2^{-1};$$

$$\mu_t = \Sigma_t^{-1}(t\Sigma_1^{-1}\mu_1 + (1-t)\Sigma_2^{-1}\mu_2)$$

$$D_{p,q} = -\log \min_t \Phi_{p,q}(t)$$

The minimization over t can be solved by using Golden Section Search (see Wikipedia, http://en.wikipedia.org/wiki/Golden_section_search), or directly by solving the following first-order derivative condition by bi-section search.

$$\frac{d\Phi_{p,q}(t)}{dt} = 0 \Rightarrow$$

$$2(\mu_1^T \Sigma_1^{-1} - \mu_2^T \Sigma_2^{-1})\mu_t - \mu_t^T \Sigma_t^{-1}(\Sigma_1^{-1} - \Sigma_2^{-1})\Sigma_t^{-1}\mu_t -$$

$$\frac{Tr(\Sigma_t^{-1}(\Sigma_1^{-1} - \Sigma_2^{-1}))}{\det\Sigma_t} + \log\left(\frac{\det\Sigma_1}{\det\Sigma_2}\right) - \mu_1^T \Sigma_1^{-1}\mu_1 + \mu_2^T \Sigma_2^{-1}\mu_2 = 0$$

Figure 1:
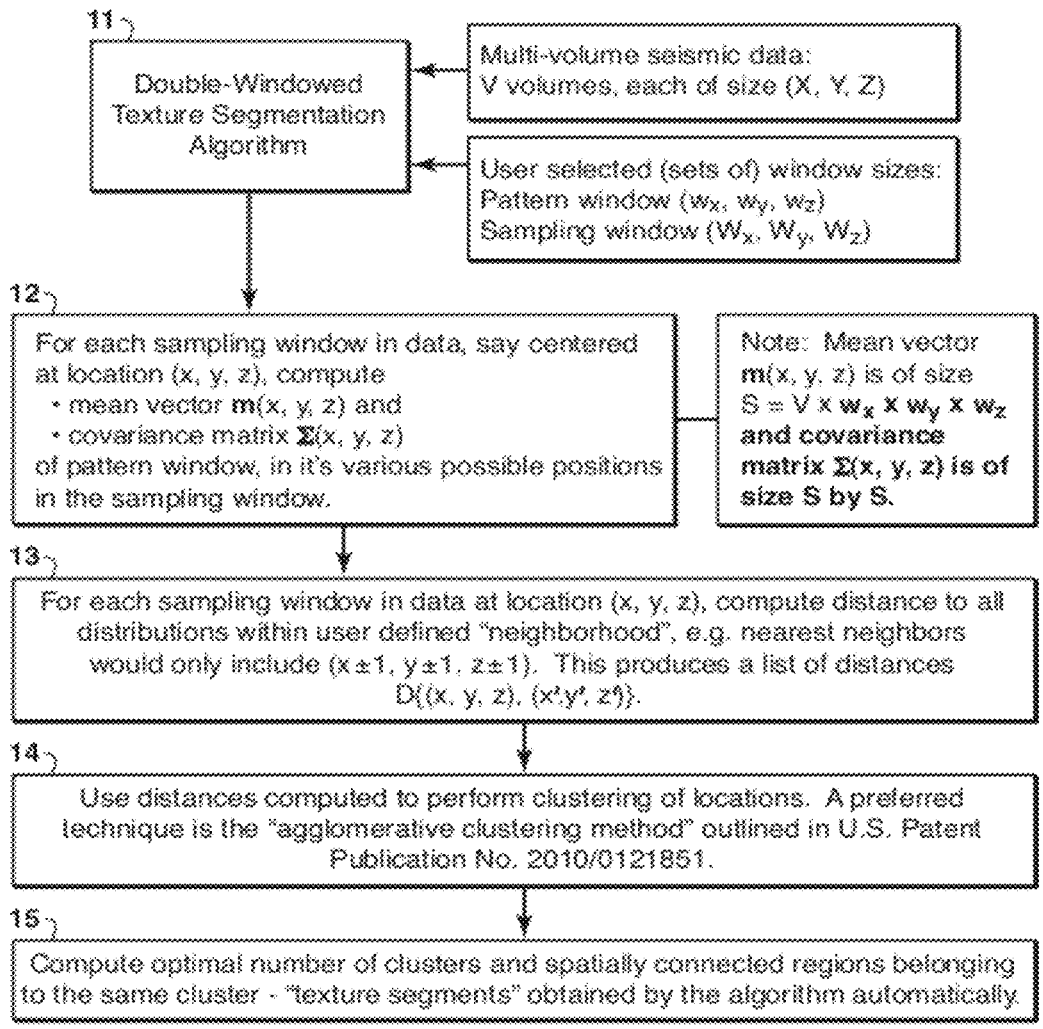
FIG. 1 is a flowchart showing basic steps in one embodiment of the present invention of method.

To summarize, basic steps in one embodiment of the present inventive method that assumes Gaussian statistics are shown in the flowchart of FIG. 1.

At step 11, the user considers a multidimensional geophysical data set, and selects a segmentation algorithm that utilizes the double-windowed texture definition of the present invention, i.e. local statistical distributions computed using two moving windows of user-selected size and shape: (1) a pattern window (2) a sampling window larger than the pattern window. At step 12, for each sampling window contained within the data, the statistical distribution (e.g. mean and covariance matrix in simplest case of Gaussian approximation) of all pattern windows contained within the sampling window is computed. At step 13, distances or dissimilarity measures between pairs of distributions are determined (optionally only within a restricted neighborhood). At step 14, distributions are clustered based on distances/dissimilarities. (In the field of data mining, the terms distance, similarity, and dissimilarity can be used interchangeably and in combination, often as modifiers of measure.) At step 15, spatially contiguous clusters are identified as texture segments.

For more detail on steps 12-14, consider a 2-D data set and at each location x,y, consider the sample window centered there. Each discrete cell within the sample window will have a data value associated with it. Next, construct a pattern vector for each possible location of the pattern window within that sample window by concatenating the data values contained in that pattern window into a $w_x \times w_y$ component vector. The distribution of the pattern vectors within the sample window is then computed. For example, this may be done by computing the mean vector and the covariance matrix. Then, this process may be repeated for all other x,y locations represented by the data set. Whether two such locations should be clustered together is determined by applying some similarity/distance measure to their respective pattern vector distributions.

In all the examples below, the various possible choices are restricted to (a) square windows of small/moderate size (b) Multi-variate Gaussian distributions (c) a simple weighted Euclidean distance metric as an approximation to the K-L divergence or its enhancement discussed earlier (d) K-means clustering. These choices are not intended to limit the scope of the invention and were made primarily for simplicity and computational tractability, as only a simple serial MATLAB implementation on a Dell 630 laptop were used. In a more commercial application, the present inventive method might be implemented, for example, on a GPU cluster, with a menu of choices of window sizes, distance metrics and clustering algorithms. We begin with the simple 1-D signal containing 3 distinct textures.

Test Examples of the Present Inventive Method

Figure 8:
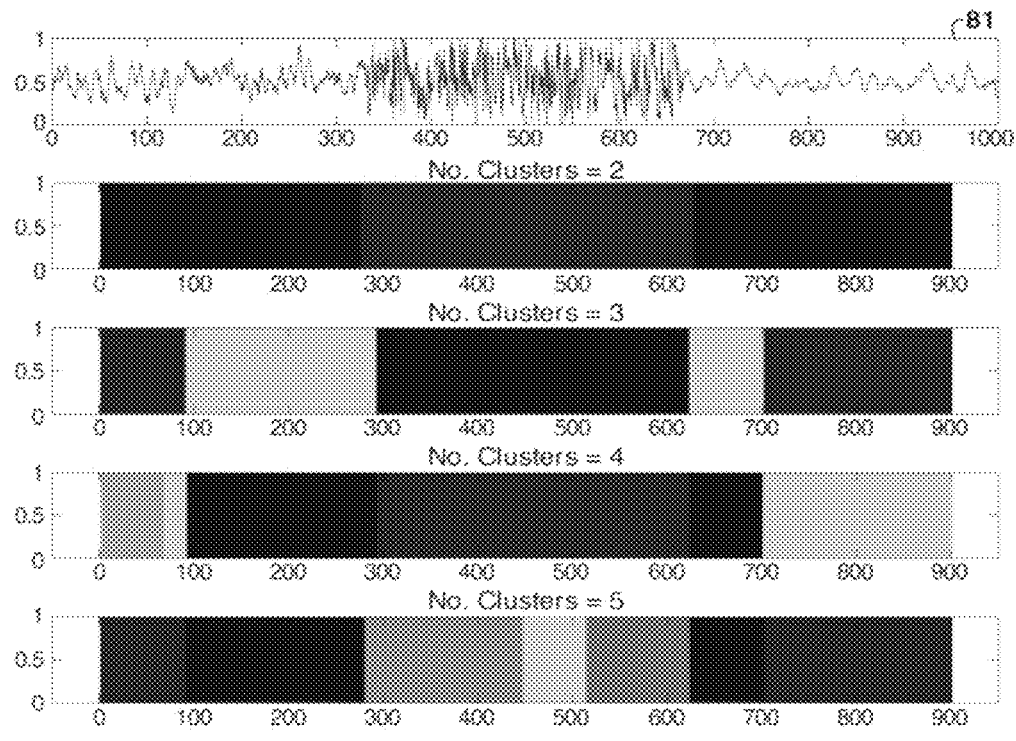
FIG. 8 illustrates texture segmentation of 1-D signal using the present inventive method with pattern window size w=20, sampling window size W=100, using a K-means clustering algorithm that provides a hierarchy of segmentations capturing varying degrees of internal structure within the textures.

The first examples, i.e. those shown in FIG. 8, use the simple 1-D signal 81 containing three distinct textures as shown in FIG. 8 (0 to approximately 350, 350-650, and 650-1000). This could be an example of any signal, such as seismic amplitude, plotted vs. time, or location in a single direction. The clustering algorithm (K-means in this case) provides a hierarchy of segmentations (four are shown in FIG. 8) capturing varying degrees of internal structure within the textures. The clusters are differentiated by color in the original colored displays. It may be noted that the segmentation results mostly match what humans would likely provide from visual inspection, which confirms the reasonableness of the automated results.

Figure 9:
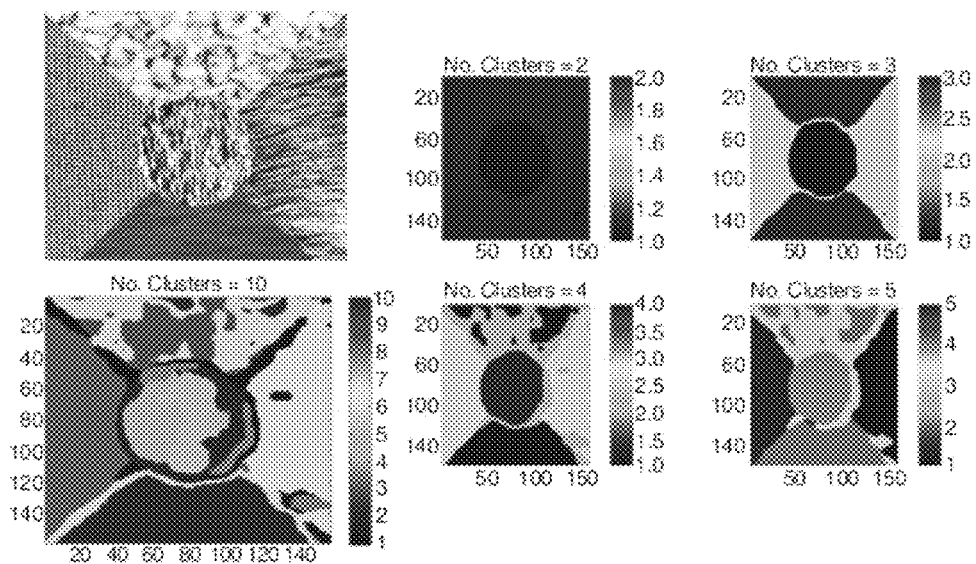
FIG. 9 illustrates texture segmentation of a 150×150 2-D texture image using the present inventive method, with a 5×5 pattern window and 10×10 sampling window.

A synthetic 2-D example is shown in FIG. 9, where segmentation of a 150×150 texture image was performed with the present inventive method, using a 5×5 pattern window and 10×10 sampling window. Five levels of segmentation are shown, i.e. number of clusters=2, 3, 4, 5, and 10.

Figure 10:
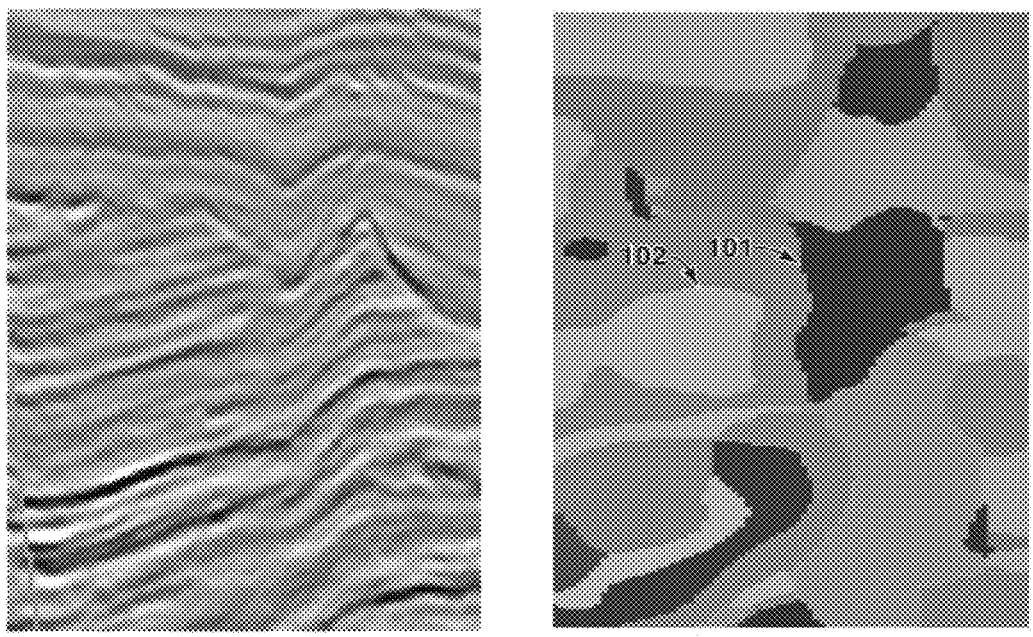
FIG. 10 shows an application of the present automatic texture segmentation method to the seismic cross-section with anticline unconformity shown on the left of the figure, with a possible interpretation of some important segments shown on the right.
Figure 11:
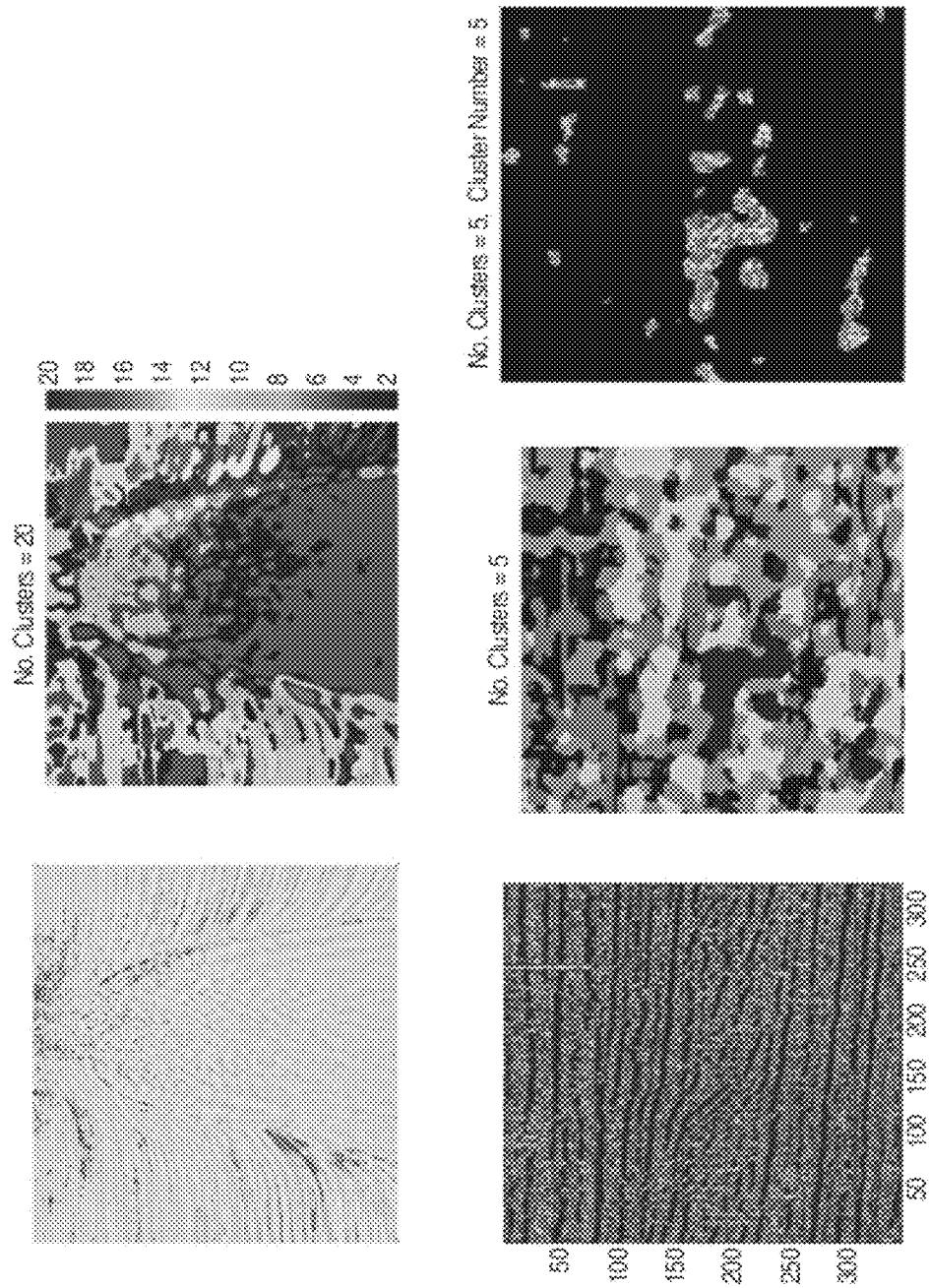
FIG. 11 shows two more seismic data test examples: segmenting a salt dome (top of figure) and dipping layers of clinoform (bottom of figure).

Finally, FIGS. 10 and 11 show example applications of the present invention method to seismic data. In FIG. 10, the automatic texture segmentation of the present inventive method is applied to an anticline uniformity in a seismic cross-section, and a possible interpretation of some important segments is shown on the right of the figure. The anticline uniformity is captured in segment 101 and segment 102 is a possible hydrocarbon migration path. FIG. 11 shows more seismic data test examples: segmenting salt dome (top of figure) and dipping layers of clinoform (bottom of figure).

All or part of FIGS. 8-11 were originally in color, but may be shown herewith as black-and-white reproductions depending upon patent law restrictions on use of color.

The foregoing patent application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

The invention claimed is:

1. A computer-implemented method for performing texture segmentation of one or more volumes of geophysical data, comprising using local statistical distributions of data values, said distributions computed using two moving windows of user-selected size and shape, one being a pattern window and the other a sampling window larger than the pattern window, wherein the pattern window moves about within the sampling window to generate the local statistical distribution for the sampling window's location, and then selecting a distance measure of similarity followed by partitioning the geophysical data into clusters on a basis of application of the distance measure of similarity to the local statistical distributions for pairs of locations.

2. The method of claim 1, wherein the local statistical distributions are statistical distributions of all pattern windows contained within the sampling window.

3. The method of claim 1, the local statistical distributions are assumed to be Gaussian, and are therefore specified by a mean vector and a covariance matrix.

4. The method of claim 1, further comprising combining spatially contiguous clusters into segments.

5. The method of claim 1, wherein the distance measure of similarity is the Kullback-Leibler Divergence.

6. The method of claim 1, wherein the distance measure of similarity for a pair of locations, called $D_{p,q}$, depends on a distribution of values of V within the sampling window, where V is a pattern vector whose components are a concatenation of the geophysical data values at each spatial location within the pattern window and p(V) is said distribution at one of the pair of locations, and on q(V) which is said distribution at the other of the pair of locations.

7. The method of claim 6, wherein $D_{p,q}$ is invariant to interchange of p and q.

8. The method of claim 7, wherein $D_{p,q}$ is mathematically expressible as $$D_{p,q} = -\log \operatorname*{Min}_{t \in [0,1]} \Phi_{p,q}(t)$$

$$\Phi_{p,q}(t) = \int dV [p(V)]^t [q(V)]^{1-t}$$

9. The method of claim 1, wherein the method is applied to at least two different volumes of geophysical data, each representing the same subsurface region, and clustering is determined on a joint basis.

10. A computer program product, comprising a non-transitory computer usable medium having a computer readable program code embodied therein, said computer readable program code adapted to be executed to implement a method for performing texture segmentation of one or more volumes of geophysical data, said method comprising using local statistical distributions of data values, said distributions computed using two moving windows of user-selected size and shape, one being a pattern window and the other a sampling window larger than the pattern window, wherein the pattern window moves about within the sampling window to generate the local statistical distribution for the sampling window's location, and then selecting a distance measure of similarity followed by partitioning the geophysical data into clusters on a basis of application of the distance measure of similarity to the local statistical distributions for pairs of locations.

11. A method for producing hydrocarbons from a subsurface region, comprising:

conducting a geophysical survey of the subsurface region;

performing texture segmentation on a volume of geophysical data from the geophysical survey, using a method of claim 1, resulting in partitioning the geophysical data into clusters;

relating the clusters to subsurface structure or geo-bodies;

upon identifying subsurface structure or a geo-body having hydrocarbon potential, drilling a well into the subsurface structure or geo-body; and producing hydrocarbons from the well.

\* \* \* \* \*